(12) United States Patent
Yang et al.

(10) Patent No.: US 10,957,048 B2
(45) Date of Patent: Mar. 23, 2021

(54) IMAGE SEGMENTATION METHOD, APPARATUS AND NON-TRANSITORY COMPUTER READABLE MEDIUM OF THE SAME

(71) Applicant: HTC Corporation, Taoyuan (TW)

(72) Inventors: Tung-Ting Yang, Taoyuan (TW); Chun-Li Wang, Taoyuan (TW); Cheng-Hsien Lin, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 133 days.

(21) Appl. No.: 16/527,043

(22) Filed: Jul. 31, 2019

(65) Prior Publication Data

US 2020/0074638 A1    Mar. 5, 2020

Related U.S. Application Data

(60) Provisional application No. 62/726,999, filed on Sep. 5, 2018.

(51) Int. Cl.
*G06T 7/174* (2017.01)
*G06K 9/62* (2006.01)
*G06T 7/00* (2017.01)

(52) U.S. Cl.
CPC ............ *G06T 7/174* (2017.01); *G06K 9/6215* (2013.01); *G06T 7/97* (2017.01); *G06T 2207/10016* (2013.01); *G06T 2207/20084* (2013.01)

(58) Field of Classification Search
CPC . G06T 7/174; G06T 7/97; G06T 2207/10016; G06T 2207/20084; G06K 9/6215
USPC ........................................................ 382/156
See application file for complete search history.

(56) References Cited

U.S. PATENT DOCUMENTS

2010/0150408 A1*  6/2010  Ishikawa ............ G06K 9/00718
382/118

* cited by examiner

*Primary Examiner* — Mark Roz
(74) *Attorney, Agent, or Firm* — CKC & Partners Co., LLC

(57) ABSTRACT

An image segmentation method is providing that includes the steps outlined below. A first image corresponding to a first time spot and a second image corresponding to a second time spot are received from a video stream, wherein the second time spot is behind the first time spot. Segmentation is performed on the second image by a segmentation neural network to generate a label probability set. Similarity determination is performed on the first image and the second image by a similarity calculation neural network to generate a similarity probability set. The label probability set and the similarity probability set are concatenated by a concatenating unit to generate a concatenated result. Further inference is performed on the concatenated result by a strategic neural network to generate a label mask.

18 Claims, 2 Drawing Sheets

IMAGE SEGMENTATION METHOD, APPARATUS AND NON-TRANSITORY COMPUTER READABLE MEDIUM OF THE SAME

RELATED APPLICATIONS

This application claims priority to U.S. Provisional Application Ser. No. 62/726,999, filed Sep. 5, 2018, which is herein incorporated by reference.

BACKGROUND

Field of Disclosure

The present disclosure relates to image processing technology. More particularly, the present disclosure relates to an image segmentation method, an image segmentation apparatus and a non-transitory computer readable medium of the same.

Description of Related Art

In computer vision, image segmentation is the process of partitioning a digital image into multiple segments. The goal of segmentation is to simplify and/or change the representation of an image into something that is more meaningful and easier to analyze. However, conventional segmentation networks only take one image as input, so the prediction would not be consistent with previous frame if the accuracy is not perfect.

Accordingly, what is needed is an image segmentation method, an image segmentation apparatus and a non-transitory computer readable medium of the same to address the above issues.

SUMMARY

An aspect of the present disclosure is to provide an image segmentation method used in an image segmentation apparatus that includes the steps outlined below. A first image corresponding to a first time spot and a second image corresponding to a second time spot are received from a video stream, wherein the second time spot is behind the first time spot. Segmentation is performed on the second image to generate a label probability set. Similarity determination is performed on the first image and the second image by a similarity calculation neural network to generate a similarity probability set. The label probability set and the similarity probability set are concatenated by a concatenating unit to generate a concatenated result. Further inference is performed on the concatenated result by a strategic neural network to generate a label mask.

Another aspect of the present disclosure is to provide an image segmentation apparatus that includes a storage module and a processing module. The storage module is configured to store a plurality of computer executable commands. The processing module is electrically coupled to the storage module and is configured to retrieve and execute the computer executable commands to execute an image segmentation method. The image segmentation method includes the steps outlined below. A first image corresponding to a first time spot and a second image corresponding to a second time spot are received from a video stream, wherein the second time spot is behind the first time spot. Segmentation is performed on the second image by a segmentation neural network to generate a label probability set. Similarity determination is performed on the first image and the second image by a similarity calculation neural network to generate a similarity probability set. The label probability set and the similarity probability set are concatenated by a concatenating unit to generate a concatenated result. Further inference is performed on the concatenated result by a strategic neural network to generate a label mask.

Yet another aspect of the present disclosure is to provide a non-transitory computer readable medium that stores an application program to execute an image segmentation method used in an image segmentation apparatus. The image segmentation method includes the steps outlined below. A first image corresponding to a first time spot and a second image corresponding to a second time spot are received from a video stream, wherein the second time spot is behind the first time spot. Segmentation is performed on the second image by a segmentation neural network to generate a label probability set. Similarity determination is performed on the first image and the second image by a similarity calculation neural network to generate a similarity probability set. The label probability set and the similarity probability set are concatenated by a concatenating unit to generate a concatenated result. Further inference is performed on the concatenated result by a strategic neural network to generate a label mask.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
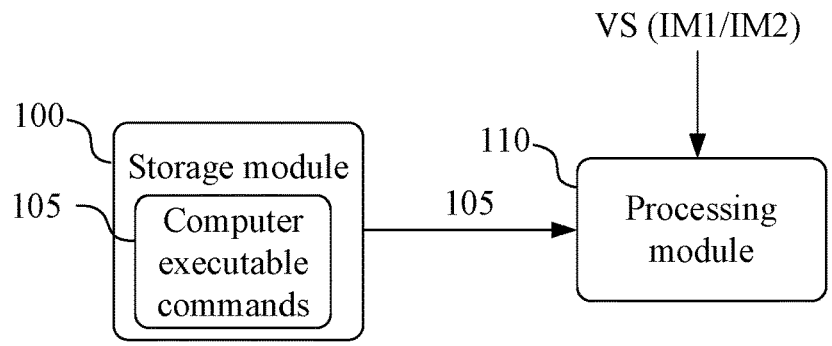
FIG. 1 is a block diagram of an image segmentation apparatus in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is now made to FIG. 1. FIG. 1 is a block diagram of an image segmentation apparatus 1 in an embodiment of the present invention. The image segmentation apparatus 1 includes a storage module 100 and a processing module 110.

In an embodiment, the storage module 100 can be such as, but not limited to an optical disk, a random access memory (RAM), a read only memory (ROM), a floppy disk, a hard disk or a compatible disk. The storage module 100 is configured to store a plurality of computer executable commands 105.

The processing module 110 is electrically coupled to the storage module 100. In an embodiment, the processing module 110 is configured to retrieve and execute the computer executable commands 105 to execute a function of the image segmentation apparatus 1. More specifically, the processing module 110 receives a first image IM1 and a second image IM2 from a video stream to perform image segmentation according to the first image IM1 and the second image IM2.

The operation of the image segmentation apparatus 1 is described in detail in the following paragraphs.

Figure 2:
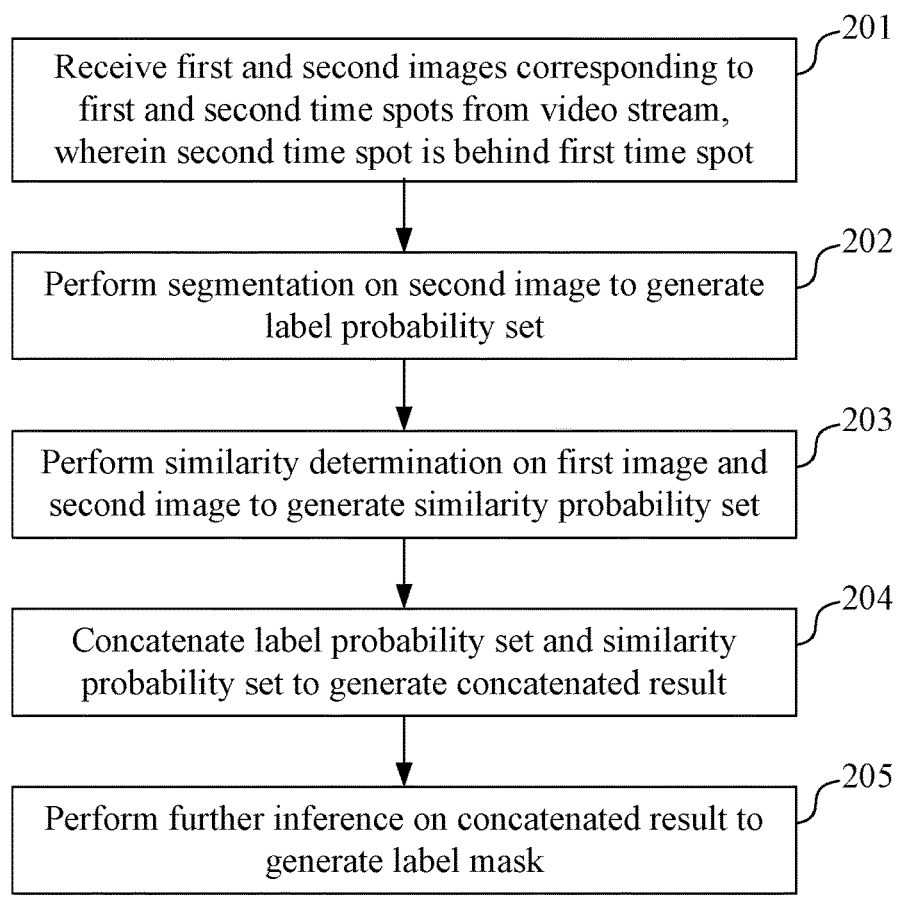
FIG. 2 is a flow chart of an image segmentation method in an embodiment of the present invention.
Figure 3:
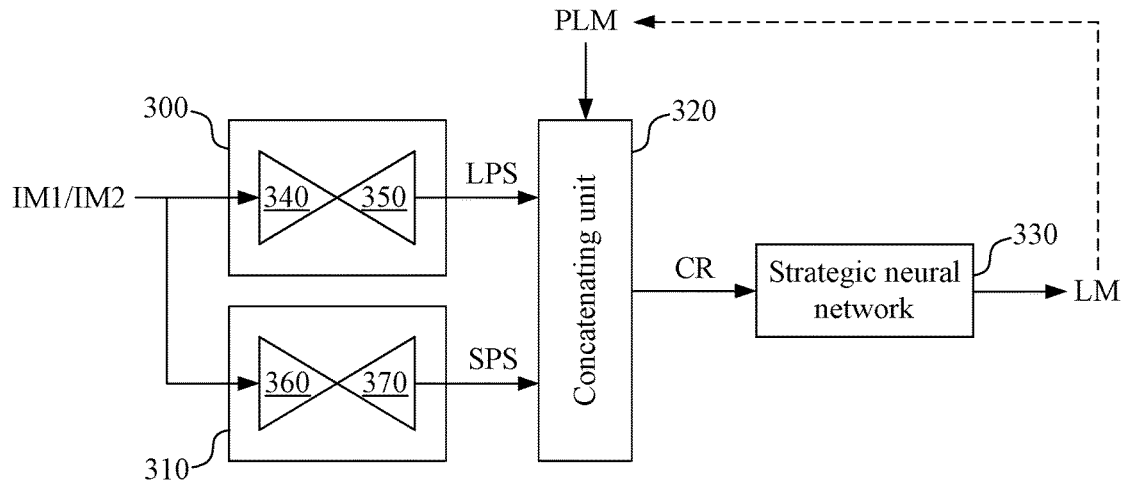
FIG. 3 is a block diagram of a system implemented according to the operation of the image segmentation apparatus in an embodiment of the present invention.

Reference is now made to FIG. 2 and FIG. 3 at the same time.

FIG. 2 is a flow chart of an image segmentation method 200 in an embodiment of the present invention. The image segmentation method 200 can be used in the image segmentation apparatus 1 illustrated in FIG. 1, or be implemented by using other hardware components such as a common processor, a computer, a server, other unique hardware devices that have a specific logic circuit or an equipment having a specific function, e.g. a unique hardware integrated by a computer program and a processor or a chip. More specifically, the image segmentation method 200 is implemented by using a computer program to control the modules in the image segmentation apparatus 1. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

FIG. 3 is a block diagram of a system 3 implemented according to the operation of the image segmentation apparatus 1 in an embodiment of the present invention. More specifically, when the processing module 110 executes the computer executable commands 105, the computer executable commands 105 operate as modules of the system 3 to perform the image segmentation method 200. The system 3 includes a segmentation neural network 300, a similarity calculation neural network 310, a concatenating unit 320 and a strategic neural network 330.

The image segmentation method 200 includes the steps outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 201, the first image IM1 corresponding to a first time spot and a second image IM2 corresponding to a second time spot are received from a video stream VS, wherein the second time spot is behind the first time spot.

In an embodiment, the first image IM1 corresponds to the time spot of T−1, while the second image IM2 corresponds to the time spot of T. In other words, the first image IM1 and the second image IM2 are frames next to each other in the video stream VS. However, the first image IM1 and the second image IM2 may be distanced from each other by at least one frame in the video stream VS. The present invention is not limited thereto.

Further, in different embodiments, the video stream VS may be received by the processing module 110 from either the storage module 100 or from a remote server accessed by using a wired or wireless method.

In step 202, segmentation is performed on the second image IM2 by the segmentation neural network 300 to generate a label probability set LPS.

In an embodiment, the segmentation neural network 300 is a convolution neural network (CNN) to perform convolution on the second image IM2 to generate the label probability set LPS.

The segmentation neural network 300 may be divided into an encoder 340 and a decoder 350. The encoder 340 is configured to be a feature extractor to gradually down scale the second image IM2 to the pixel level to extract features. The decoder 350 is configured to be a feature generator to gradually up scale the pixels to generate features to generate the label probability set LPS. In an embodiment, the label probability set LPS includes a plurality of label possibilities, in which each of the label possibilities corresponds to the possibility of a label corresponding to a predefined object.

In step 203, similarity determination is performed on the first image IM1 and the second image IM2 by the similarity calculation neural network 310 to generate a similarity probability set SPS.

In an embodiment, the similarity calculation neural network 310 is also a convolution neural network (CNN) to perform convolution on the first image IM1 and the second image IM2 to generate the similarity probability set SPS.

Identically, the similarity calculation neural network 310 may also be divided into an encoder 360 and a decoder 370. The operation of the encoder 360 and the decoder 370 is identical to the operation of the encoder 340 and the decoder 350 but with a different topology and is not further described herein.

It is appreciated that in an embodiment, the encoder 340 and the encoder 360 can be implemented by the same encoder. More specifically, the segmentation neural network 300 and the similarity calculation neural network 310 share one encoder without splitting into two independent networks. As a result, only one operation of the scale-down process is required for the segmentation neural network 300 and the similarity calculation neural network 310.

In an embodiment, the similarity probability set SPS includes a plurality of similarity possibilities, in which each of the similarity possibilities corresponds to the possibility of a similarity of each of a corresponding pixel between the first image IM1 and the second image IM2.

The effect of the similarity calculation neural network 310 is that, in the sequential video segmentation, the difference between current image and previous image is few, especially when the camera for retrieving the images stays at the nearly identical position. If most of parts in images are unchanged, only with some noise perturbation, the segmentation label of the unchanged parts' pixels should have higher chance stay the same. By applying the similarity calculation neural network 310, we can measure the similarity probability of each pixel with the one from previous frame, and get the information about which part of image most likely be changed. Finally, the system can modify the prediction mask accordingly.

In step 204, the label probability set LPS and the similarity probability set SPS are concatenated by a concatenating unit 320 to generate a concatenated result CR.

In an embodiment, since the label probability set LPS and the similarity probability set SPS are generated on the pixel level, when each of the first image IM1 and the second image IM2 has a dimension of X×Y, each of the label probability set LPS and the similarity probability set SPS has the dimension of X×Y too. As a result, the concatenated result CR has a dimension of X×Y×2.

In step 205, further inference is performed on the concatenated result CR by a strategic neural network 330 to generate a label mask LM.

In an embodiment, the strategic neural network 330 is also a convolution neural network (CNN) to perform convolution on the concatenated result CR to generate the label mask LM that also has a dimension of X×Y.

In an embodiment, the strategic neural network 330 may also include an encoder and a decoder to perform convolution by down scaling and up scaling the concatenated result CR. In another embodiment, the strategic neural network 330 may also perform convolution without down scaling and up scaling the concatenated result CR.

The label mask LM generated by the strategic neural network 330 identifies each of the labels corresponding to different predefined objects. More specifically, the label mask LM is the result of the image segmentation.

It is appreciated that in an embodiment, a previous label mask PLM having a dimension of X×Y can be fed to the concatenating unit 320 such that the label probability set LPS, the similarity probability set SPS and the label mask LM are concatenated by the concatenating unit 320 to generate the concatenated result CR having the dimension of X×Y×3.

Under such a condition, inference is performed on the concatenated result CR having the dimension of X×Y×3 by the strategic neural network 330 to generate the label mask LM. The label mask LM can be further fed back to the concatenating unit 320 as the previous label mask PLM.

In some approaches, the image segmentation is performed only by taking the current image into consideration. The prediction would not be consistent with previous frame if the accuracy is not perfect.

On the contrary, the image segmentation apparatus 1 and the image segmentation method 200 of the present invention take the previous image into consideration to generate the information of the similarity to increase the consistency of the sequential segmentation result. Further, by using the previous label mask PLM, the information of the previous segmentation result is also taken into consideration to provide even more consistent segmentation result.

Figure 4:
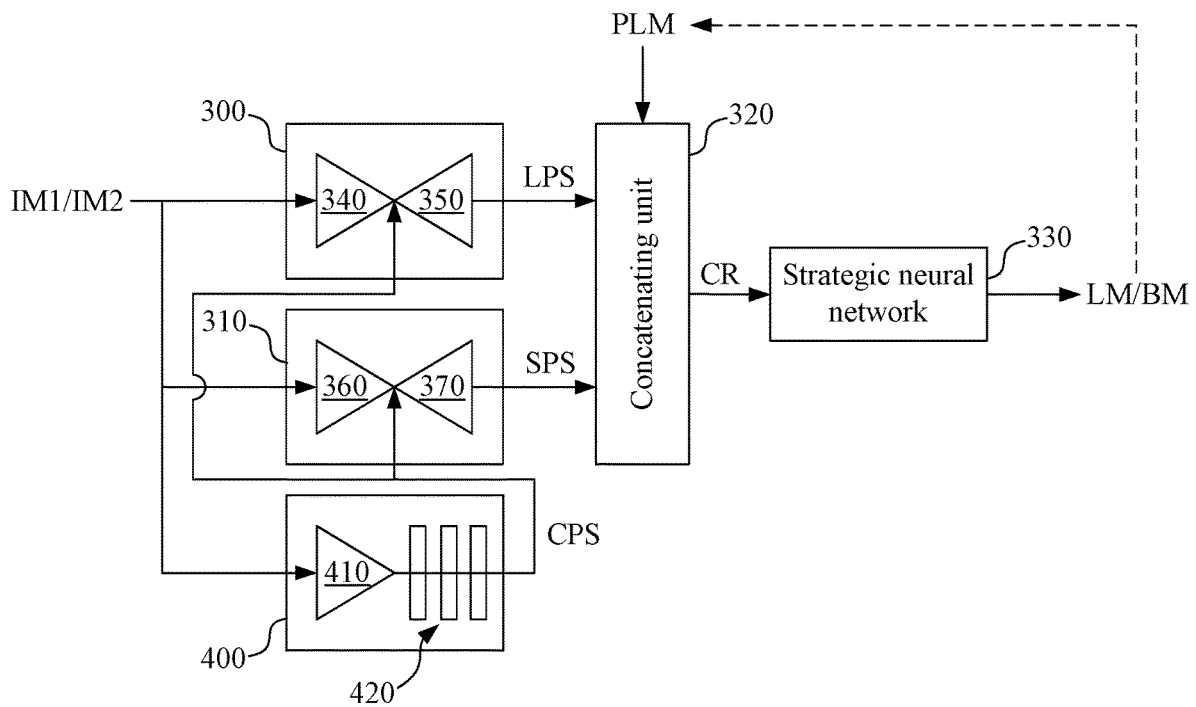
FIG. 4 is a block diagram of a system implemented according to the operation of the image segmentation apparatus in another embodiment of the present invention.

FIG. 4 is a block diagram of a system 4 implemented according to the operation of the image segmentation apparatus 1 in another embodiment of the present invention. More specifically, when the processing module 110 executes the computer executable commands 105, the computer executable commands 105 operate as modules of the system 4 to perform the image segmentation method 200.

Identical to the system 3 illustrated in FIG. 3, the system 4 includes the segmentation neural network 300, the similarity calculation neural network 310, the concatenating unit 320 and the strategic neural network 330. As a result, the identical components are not described herein.

The system 4 further includes a classification neural network 400. The classification neural network 400 is configured to performing a classification on the second image IM2 to generate a class probability set CPS.

In an embodiment, the classification neural network 400 is also a convolution neural network (CNN) to perform convolution on the second image IM2 to generate the class probability set CPS, in which the classification is performed at an image level.

In an embodiment, the classification neural network 400 may also include an encoder 410 for down scaling the concatenated result CR, and a processor 420 that includes either conventional fully-connected layers or other classification network modules to process the down scaled result. In an embodiment, the encoder 410 of the classification neural network 400 can also be shared with the encoder 340 of the segmentation neural network 300 and the encoder 360 of the similarity calculation neural network 310 to reduce the amount of computation.

After the generation of the class probability set CPS, the class probability set CPS can be fed to the segmentation neural network 300 and the similarity calculation neural network 310 to determine whether a desired class exists or the class probability set CPS of corresponding to a desired class is smaller than a predetermined value.

For example, if a desired class corresponds to a human face, whether the desired class probability corresponds to the human face in the class probability set CPS is smaller than a predetermined value is determined.

When the desired class probability is smaller than the predetermined value, the segmentation and similarity determination are stopped to perform. More specifically, the operations of the segmentation neural network 300 and the similarity calculation neural network 310 are ceased when the desired class probability is smaller than the predetermined value.

In an embodiment, the classification neural network 400, the segmentation neural network 300 and the similarity calculation neural network 310 shares the same encoder. As a result, after the class probability set CPS is generated by the classification neural network 400, the decoders 350 and 370 of the segmentation neural network 300 and the similarity calculation neural network 310 stop to perform further operation.

Furthermore, since the operations of the segmentation neural network 300 and the similarity calculation neural network 310 are stopped, a blank mask BM is generated by the strategic neural network 330.

Since the operations of the segmentation neural network 300 and the similarity calculation neural network 310 are time-consuming, the classification neural network 400 provides an early-classification mechanism when the desired class of object is not presented to reduce the time-consuming operation.

In summary, the image segmentation apparatus 1 and the image segmentation method 200 of the present invention perform segmentation according to not only the current image but also the previous image, the consistency of the sequential segmentation result can be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image segmentation method used in an image segmentation apparatus, the image segmentation method comprises:
    receiving a first image corresponding to a first time spot and a second image corresponding to a second time spot from a video stream, wherein the second time spot is behind the first time spot;
    performing segmentation on the second image by a segmentation neural network to generate a label probability set;
    performing similarity determination on the first image and the second image by a similarity calculation neural network to generate a similarity probability set;
    concatenating the label probability set and the similarity probability set by a concatenating unit to generate a concatenated result; and
    performing further inference on the concatenated result by a strategic neural network to generate a label mask.

2. The image segmentation method of claim 1, wherein each of the segmentation neural network, the similarity calculation neural network and the strategic neural network is a convolution neural network (CNN), and each of the segmentation neural network and the similarity calculation neural network is configured to perform convolution on the first image and the second image and the strategic neural network is configured to perform convolution on the concatenated result.

3. The image segmentation method of claim 1, further comprising:
    performing segmentation on the second image by a first encoder and a first decoder of the segmentation neural network to generate the label probability set; and
    performing similarity determination on the first image and the second image by a second encoder and a second decoder of the similarity calculation neural network to generate the similarity probability set.

4. The image segmentation method of claim 3, wherein the first encoder and the second encoder are the same encoder.

5. The image segmentation method of claim 3, wherein the segmentation is performed on the second image by the segmentation neural network in a pixel level, and the image segmentation method further comprises:
    performing a classification on the second image by a classification neural network to generate a class probability set;
    determining whether a desired class probability in the class probability set of corresponding to a desired class is smaller than a predetermined value; and
    stopping to perform segmentation and similarity determination when the desired class probability is smaller than the predetermined value to generate a blank mask.

6. The image segmentation method of claim 1, further comprising:
    concatenating the label probability set, the similarity probability set and a previous label mask to generate the concatenated result; and
    performing further inference on the concatenated result by the strategic neural network to generate the label mask.

7. An image segmentation apparatus comprising:
    a storage module configured to store a plurality of computer executable commands; and
    a processing module electrically coupled to the storage module and configured to retrieve and execute the computer executable commands to execute an image segmentation method, the image segmentation method comprises:
        receiving a first image corresponding to a first time spot and a second image corresponding to a second time spot from a video stream, wherein the second time spot is behind the first time spot;
        performing segmentation the second image by a segmentation neural network to generate a label probability set;
        performing similarity determination on the first image and the second image by a similarity calculation neural network to generate a similarity probability set;
        concatenating the label probability set and the similarity probability set by a concatenating unit to generate a concatenated result; and
        performing further inference on the concatenated result by a strategic neural network to generate a label mask.

8. The image segmentation apparatus of claim 7, wherein each of the segmentation neural network, the similarity calculation neural network and the strategic neural network is a convolution neural network (CNN), and each of the segmentation neural network and the similarity calculation neural network is configured to perform convolution on the first image and the second image and the strategic neural network is configured to perform convolution on the concatenated result.

9. The image segmentation apparatus of claim 7, wherein the image segmentation method further comprises:
    performing segmentation on the second image by a first encoder and a first decoder of the segmentation neural network to generate the label probability set; and
    performing similarity determination on the first image and the second image by a second encoder and a second decoder of the similarity calculation neural network to generate the similarity probability set.

10. The image segmentation apparatus of claim 9, wherein the first encoder and the second encoder are the same encoder.

11. The image segmentation apparatus of claim 9, wherein the segmentation is performed on the second image by the segmentation neural network in a pixel level, and the image segmentation method further comprises:
performing a classification on the second image by a classification neural network to generate a class probability set;
determining whether a desired class probability in the class probability set of corresponding to a desired class is smaller than a predetermined value; and
stopping to perform segmentation and similarity determination when the desired class probability is smaller than the predetermined value to generate a blank mask.

12. The image segmentation apparatus of claim 7, wherein the image segmentation method further comprises:
concatenating the label probability set, the similarity probability set and a previous label mask to generate the concatenated result; and
performing further inference on the concatenated result by the strategic neural network to generate the label mask.

13. A non-transitory computer readable medium that stores an application program to execute an image segmentation method used in an image segmentation apparatus, wherein the image segmentation method comprises:
receiving a first image corresponding to a first time spot and a second image corresponding to a second time spot from a video stream, wherein the second time spot is behind the first time spot;
performing segmentation on the second image by a segmentation neural network to generate a label probability set;
performing similarity determination on the first image and the second image by a similarity calculation neural network to generate a similarity probability set;
concatenating the label probability set and the similarity probability set by a concatenating unit to generate a concatenated result; and
performing further inference on the concatenated result by a strategic neural network to generate a label mask.

14. The non-transitory computer readable medium of claim 13, wherein each of the segmentation neural network, the similarity calculation neural network and the strategic neural network is a convolution neural network (CNN), and each of the segmentation neural network and the similarity calculation neural network is configured to perform convolution on the first image and the second image and the strategic neural network is configured to perform convolution on the concatenated result.

15. The non-transitory computer readable medium of claim 13, wherein the image segmentation method further comprises:
performing segmentation on the second image by a first encoder and a first decoder of the segmentation neural network to generate the label probability set; and
performing similarity determination on the first image and the second image by a second encoder and a second decoder of the similarity calculation neural network to generate the similarity probability set.

16. The non-transitory computer readable medium of claim 15, wherein the first encoder and the second encoder are the same encoder.

17. The non-transitory computer readable medium of claim 15, wherein the segmentation is performed on the second image by the segmentation neural network in a pixel level, and the image segmentation method further comprises:
performing a classification on the second image by a classification neural network to generate a class probability set;
determining whether a desired class probability in the class probability set of corresponding to a desired class is smaller than a predetermined value; and
stopping to perform segmentation and similarity determination when the desired class probability is smaller than the predetermined value to generate a blank mask.

18. The non-transitory computer readable medium of claim 13, wherein the image segmentation method further comprises:
concatenating the label probability set, the similarity probability set and a previous label mask to generate the concatenated result; and
performing further inference on the concatenated result by the strategic neural network to generate the label mask.

* * * * *